Patented July 11, 1944

2,353,571

UNITED STATES PATENT OFFICE 2,353,571

ADSORPTION RECOVERY OF PHOSPHATIDE MATERIAL FROM VEGETABLE OILS CONTAINING IT

Henry R. Kraybill, Pearl H. Brewer, and Max Horsley Thornton, West Lafayette, Ind., assignors to Purdue Research Foundation, West Lafayette, Ind., a corporation of Indiana No Drawing. Application March 20, 1941, Serial No. 384,352

14 Claims. (Cl. 260—403)

It is the object of our invention to separate phosphatide material from vegetable oils containing it, and to recover the phosphatide material as such; and to do so by a simple, rapid, efficient, and inexpensive adsorption procedure.

Our invention is applicable generally to vegetable oils containing substantial quantities of phosphatide material, for some vegetable oils contain very little of it; and is more particularly applicable to soybean oils, which are rich in such phosphatide material, whether the soybean oil is an expressed oil or an extracted oil.

This present application is a continuation in part of our co-pending applications Serial Nos. 171,910 and 171,984, both filed October 30, 1937, now respectively Patents Nos. 2,276,316 and 2,276,317, both granted March 17, 1942, and of our co-pending application Serial No. 245,620, filed December 14, 1938; and those three applications are all continuations in part of our application Serial No. 122,218, filed January 25, 1937, with which all of them were co-pending. The claims of said Patents Nos. 2,276,316 and 2,276,317 are directed to certain products, while the claims of the present application are directed to a process.

It is set forth in Patent No. 2,069,187, granted January 26, 1937, on an application filed by one of us (Kraybill), that the "break" in break soybean oils is caused by the presence of crude phosphatides; and that if those crude phosphatides are removed from a break soybean oil a non-break soybean oil is obtained. That patent tells of a way, with two variants of it as examples, to remove such phosphatides from soybean oils, and of obtaining both a non-break soybean oil and phosphatide material.

It is also known, and has been known for years, that break soybean oils can be refined by the well-known acid-refining and alkali-refining processes to produce a non-break soybean oil. It has not been so generally known, although it is the case, that in those refining processes, whether with acid or alkali, the oil was substantially freed of phosphatides; but in general the phosphatides were not recovered in those refining processes, but instead were destroyed and lost.

We have discovered that phosphatide material may be simply and effectively recovered from vegetable oils containing it, and especially from soybean oils, by an adsorption process. In that adsorption process, the vegetable oil containing phosphatide material is brought into intimate contact with a solid adsorbent substance having an adsorbing surface which has an affinity for phosphatides, and that solid adsorbent substance adsorbs the phosphatide material out of the oil and thus directly converts the oil from a break oil into a non-break oil; and the phosphatide material is recovered from the solid adsorbent substance by solvent extraction of the latter, with suitable solvents, one or more as desired, for taking up different fractions of the phosphatide material.

So far as we are aware, we are the first to use this adsorption method for recovering phosphatide material from vegetable oils containing it; and the first to convert a phosphatide-rich vegetable oil into a substantially phosphatide-free vegetable oil by the adsorption method; and the first to recover phosphatide material from a vegetable oil containing it by adsorbing the phosphatide material on an adsorbent solid having an adsorbing surface, and removing the phosphatide material from that solid by solvent extraction.

The adsorption of the phosphatide material from the phosphatide-containing vegetable oil by the adsorbent solid having the adsorbing surface is most conveniently done by percolation, by passing the phosphatide-containing vegetable oil through a column of such solid adsorbent material, with the latter conveniently in a fairly finely divided form so that there will be a high ratio of surface to volume. But it can be done by any procedure of producing intimate contact between oil and solid adsorbent, such for instance as simple mixing and agitation.

The phosphatide-containing vegetable oils which may be subjected to our process range from vegetable oil sludges, and even vegetable fats which may require heat to put them into the liquid state which is necessary for our process, to the so-called "clarified oils" which have been partly refined but which still contain phosphatide material. Among such oils are soybean oil, cottonseed oil, corn oil, sesame oil, peanut oil, and rapeseed oil, all of which in the crude state contain phosphatides. But the oils to which our invention is particularly applicable are those which are rich in phosphatides, particularly soybean oil, cottonseed oil, and corn oil; and our invention is of peculiar and especial advantage in the treatment of soybean oils, which are especially high in such phosphatide material.

The phosphatide material which is adsorbed on the solid adsorbent is adsorbed in substantially unaltered condition; and it is recovered from the solid adsorbent by solvent extraction. The solvents used may be of varying character, according to the phosphatide fractions desired; but in general are organic solvents. By proper selection of the extracting solvents, it is possible to obtain substantially all the phosphatide material, in a plurality of fractions; and incidentally to leave the solid adsorbent in a clean and revivified condition, so that it may be re-used for further recovery of phosphatide material from vegetable oils containing it.

This process has an advantage over the usual refining processes that involve material heating and treatment with acids or alkalies, in that there is involved no chemical decomposition, and so no production of decomposition products which remain in the vegetable oil after the treatment. In addition, vegetable oils which have been treated by our process ordinarily do not require subsequent bleaching, such as is commonly required for vegetable oils refined by the hitherto known refining processes. Further, we find that vegetable oils refined by our process tend to remain in high-class condition, as is required for edible oils, for longer periods than do vegetable oils refined by hitherto known processes.

The phosphatide material which is taken up by the solid adsorbent consists largely of true phosphatides, but with some mucilages, sterols, sterol glucosides, free fatty acids, and pigments. The selective solvent extraction with the organic solvents separates these adsorbed materials from one another, to any desirable extent, so that the useful ones may be made available for the purposes for which they are adapted.

The solvent or solvents used in recovering the phosphatide material from the solid adsorbent may include acetone, benzene, toluene, carbon tetrachloride, dichlorethylene, hexane, cyclohexane, chloroform, ether, concentrated and dilute alcohols, particularly ethyl alcohol, and mixtures of these; and many others. Usually a plurality of extractions is desirable, with different solvents, as no single solvent dissolves all the constituents of the adsorbed phosphatide material.

The adsorbent solid having the adsorbing surface may be any solid adsorbent which has an affinity for phosphatide material. There are many such adsorbents, which as a class may be called phosphatides-adsorbing adsorbent solids. Some of these adsorbents of this class are much better than others in their phosphatides-adsorbing capacity. It is desirable that the solid adsorbent have a greater affinity for phosphatide material than the oil itself has. Although our invention is not limited to it, and includes the use of the less efficient phosphatides-adsorbing adsorbent solids such for instance as activated clays (such as "filtrol"), aluminum oxide, and especially alumina which has been activated by pretreatment with a mineral acid, acid-treated greensand (such as "glaucosil"), magnesium oxide, anhydrous calcium sulfate, activated charcoal, and even calcium hydroxide, we prefer to use a solid inorganic adsorbent material of sufficiently high adsorbent capacity that a 20-gram lot of it is capable of adsorbing from 200 grams of crude soybean oil of between 0.06% and 0.08% phosphorous content at least enough phosphatide material to reduce the phosphorous content of the oil to one-third of its original value. Among such adsorbent materials that have that capacity are Lloyd's reagent and certain other naturally occurring aluminum silicates, precipitated tricalcium phosphate, and some artificial zeolites; and two excellent solid adsorbents, and the ones which we deem best and which we prefer to use, are the silica foam which is described in Patent No. 2,176,851, granted October 17, 1939, on the application of two of us (Brewer and Kraybill), and the specially prepared sodium aluminum silicate which is described in Patent No. 2,174,177, granted September 26, 1939, on the application of all three of us. These solid adsorbents are mentioned merely by way of example, for any phosphatide-adsorbing solid adsorbent may be used.

The silica foam of the Brewer and Kraybill Patent No. 2,176,851 above referred to is prepared by passing carbon dioxide into a concentrated water solution of sodium silicate to produce a gel containing a carbonate, treating the gel so formed with an acid which reacts with the carbonate to liberate carbon dioxide and so to cause the gel to expand into a solid form, washing the solid foam with water, and then drying that solid foam.

The specially prepared sodium aluminum silicate of the Kraybill, Brewer and Thornton Patent No. 2,174,177 above referred to is prepared by mixing a water solution of sodium silicate with a water solution of an acid-reacting aluminum salt, to form a gelatinous precipitate, and keeping the amount of water present prior to the formation of such gelatinous precipitate sufficiently small so that almost but not quite all of it is taken up in the precipitate, mixing said precipitate with additional water in sufficient quantity to prevent the whole from forming a gel on standing, filtering to remove excess water, washing, and drying.

In carrying out our invention in one simple form, we form a filter column of the desired solid adsorbent material, and cause the initial crude or relatively crude phosphatide-containing vegetable oil, even such a crude oil as a vegetable-oil sludge, to be passed into the top of this filter column and the refined oil to be drawn off from the bottom thereof. The passage of the oil through the filter may be a natural gravity passage, or may be accelerated in any suitable way as by pressure and/or by suction. The oil which passes from such a filter column is an excellent grade of the vegetable oil used, substantially free from the phosphatide material which is present in the natural oil and which is removed by the solid adsorbent material.

Instead of using a filter column of the solid adsorbent material, and passing through that column the crude or relatively crude vegetable oil to be refined, we may mix the solid adsorbent material with such oil, and agitate vigorously to produce thorough and intimate contact; and then separate the oil from the solid adsorbent material, which latter now has the phosphatide material adsorbed thereon. Such separation may, for instance, be by filtering or by centrifuging; or, although less effectively, even by decanting.

Ordinarily it is necessary to use the process only once to recover the phosphatide material, especially when the filter column is used. If desired, however, as because the solid adsorbent material may have become saturated, the process may be repeated one or more times.

The refined vegetable oil which is thus obtained by adsorbing the phosphatide material out of it by a solid adsorbent material is suitable for most industrial purposes without further treatment. For instance, in the case of soybean oil it is a non-break oil, even if the original oil was a break oil. It is substantially clear. It is substantially free not only from phosphatides, but also from the greater part of many other originally present substances, such as mucilages, sterol glucosides, and free fatty acids. It is substantially free from red pigments, and usually has the amount of yellow pigments reduced. While it may still contain some sterols, the amount of sterols present in it is usually materially less than in the original vegetable oil. All of these things, some of which are valuable in themselves, are objectionable in a vegetable oil; and the oil is improved by their removal. When the refined vegetable oil is to be used as an edible oil, a deodorizing treatment is ordinarily still desirable.

When the solid adsorbent material approaches saturation, or before that if desired, it is desirable to treat it with the desired solvent or solvents to remove from it the adsorbed phosphatide material, and other material present with the phosphatide material, not only so that the adsorbent material may be used again, but primarily and mainly so that the adsorbed phosphatide material may be recovered. As already stated, it is usually desirable to use a succession of solvents. We usually extract the solid adsorbent material first with acetone; which extracts any adherent oil, and also removes some of the sterols and sterol glucosides, which if present in the original oil were adsorbed with the phosphatides by the solid adsorbent material. Next we usually extract the solid adsorbent material with ethyl ether; which removes the greater part of the adsorbed phosphatide material, as a mixed solute, consisting mainly of phosphatides. As a third solvent we preferably use anhydrous ethyl alcohol (99% to 99.5%), which takes up another mixed solute, consisting mainly of a different phosphatide fraction. Finally we extract the adsorbent material with dilute ethyl alcohol (between 20% and 70%), which is usually as far as we carry the treatment of the used solid adsorbent material. Incidentally, the solid adsorbent material may be re-used very efficiently after being treated with some or all of such a series of solvents; and indeed, although with less effectiveness, after being treated only with one or two of them, such for instance as ethyl ether.

The adsorbed phosphatide material which is thus removed from the solid adsorbent substance is in substantially unaltered condition; and by suitable processes of separation its various components may be obtained, in a purity dependent upon the extent of the separation, and used where they are commercially desirable. This separation of the recovered phosphatide material into components, although important, is a relatively secondary part of the present fundamental invention, of recovering phosphatide material from phosphatide-containing vegetable oil by the adsorption on a solid adsorbent and removal of the phosphatide material from the solid adsorbent by solvent extraction.

While the process of recovering the adsorbed phosphatide material from the solid adsorbent substance, and of separating the recovered adsorbed phosphatide material into its components, may be varied, in accordance with the nature of the original vegetable oil and the nature of what it is desired to obtain, the following is an example of one process which has been found particularly effective in recovering phosphatide material from soybean oil.

*a.* The solid adsorbent material with the adsorbed material thereon is extracted with acetone, as already noted. The acetone is evaporated from the acetone extract, to leave as a residue the oil which the acetone had dissolved, with sterols and sterol glucosides in that oil. Some of the sterol glucosides in the oil precipitate upon the evaporation of the acetone; and those precipitated sterol glucosides are removed from the oil by filtration. The remaining oil, with such sterols and sterol glucosides as it may still contain, may then be passed again through the solid adsorbed material. If desired, however, such remaining oil may be suitably treated to remove sterols and/or sterol glucosides therefrom, before such oil is passed again through the adsorbent material; but that process of separating the sterols and/or sterol glucosides from the oil forms the subject-matter of another invention by two of us (Kraybill and Thornton), as set forth in their Patent No. 2,225,375, granted December 17, 1940.

*b.* After having been extracted with acetone, the solid adsorbent material is extracted with ethyl ether, as has also been already noted. The ether extract may be subjected to evaporation, desirably in vacuum, to drive off the ether and to leave behind a very good grade of phosphatides. Instead of eliminating the ether from the ether extract, we may treat that ether extract, after concentrating it by evaporation if desired, with about four times its volume of acetone, to precipitate the phosphatides; after which the supernatant liquid is suitably removed, as by filtering or centrifuging. With either way of obtaining the phosphatides substantially free of a solvent, we preferably dry the phosphatide residue, in vacuum or in an inert gas. This residue may be called fraction B. We may add a suitable oil or fat of any desired character to make an oil or fat solution of this fraction B.

If the phosphatides were precipitated by the addition of acetone, and the supernatant liquid then removed, that supernatant liquid is desirably evaporated; upon which evaporation a gummy-like product remains which contains some sterol glucosides.

Instead of adding an oil or fat to the phosphatides (fraction B) obtained by evaporation of the ether or precipitation from the ether, we may extract such phosphatides (fraction B) with concentrated ethyl alcohol, of desirably at least 90% concentration. The alcohol dissolves part of the phosphatides, and leaves part undissolved; and the two are suitably separated, as by decanting, filtering, or centrifuging. The solid residue now remaining may be called fraction $B_1$—which is soluble in ether and insoluble in acetone and in anhydrous alcohol. The alcohol extract is subjected to evaporation to drive off the alcohol, which leaves the solute substantially oil free and at ordinary temperatures a very viscous liquid. This may be called fraction $B_2$—which is substantially wholly soluble in ether, in acetone, and in anhydrous alcohol, and substantially insoluble in dilute alcohol. Thus the phosphatides are divided into two parts, one alcohol-soluble and the other alcohol-insoluble. Both fractions are rich in phosphatides, and both are excellent emulsifying agents, but the alcohol-soluble fraction is much better than the alcohol-insoluble fraction as an emulsifying agent and is soluble in acetone.

*c.* After having extracted the adsorbent material with acetone and with ether, we next extract it with concentrated ethyl alcohol, desirably anhydrous (about 99% to 99.5%). This alcohol extract is subjected to evaporation, desirably under vacuum; and the residue from that alcohol extraction is extracted with ether, and the whole subjected to filtering or centrifuging to separate the liquid from the solids. The solids consist largely of crystalline sterol glucosides. The liquid is subjected to evaporation, desirably under vacuum, to leave a residue, which we may call fraction C, which is a highly purified grade of phosphatides, substantially wholly soluble in ether and in anhydrous alcohol and substantially insoluble in acetone and in dilute alcohol.

d. After the adsorbent reagent has been extracted as aforesaid successively with acetone, ether, and anhydrous alcohol, it is then extracted with dilute alcohol (about 20% to 70%). The dilute-alcohol extract is subjected to evaporation. The evaporation may be continued until substantially all the alcohol and water have been driven off, which leaves as a residue a good emulsifying or foaming agent; which may be called fraction D. This is soluble in dilute alcohol of between 20% and 70% alcohol concentration, capable of forming a colloidal suspension in water, and soluble in water solutions of an alkali to form a solution from which it may be precipitated by the addition of either hydrochloric or sulfuric acid.

Instead of obtaining this fraction D as a whole, it may be obtained as two sub-fractions $D_1$ and $D_2$. To that end, the evaporation to drive off alcohol and water may be continued only until the volume is reduced to about one-fourth of the original, when it is found that there is a floating gummy residue, which may be called fraction $D_1$. That gummy residue (fraction $D_1$) is skimmed off, is practically insoluble in water, is soluble in ether, in acetone, in benzene, and in toluene, is soluble in water solutions of an alkali to form solutions from which it may be precipitated by the addition of either hydrochloric or sulfuric acid, and is a good emulsifying and foaming agent.

After the gummy residue has been skimmed off, the remaining solution is evaporated to small volume, almost to dryness, and an excess of acetone is added. This produces a precipitate, which may be called fraction $D_2$. This is suitably separated, as by filtration, and dried to free it from acetone. The product thus obtained (fraction $D_2$) is soluble in water and in dilute alcohol, and practically insoluble in ether, in absolute alcohol, in acetone, and in benzene. It is a good emulsifying and foaming agent. It is soluble in water solutions of an alkali, and is precipitated from said alkali solutions and from water solutions, probably as an acid, by the addition of either hydrochloric or sulfuric acid.

We claim as our invention:

1. Method of recovering phosphatide material from a vegetable oil containing it which consists in bringing the vegetable oil and a phosphatide-material adsorbing solid into intimate contact to cause adsorption of said material upon said solid, separating said solid with the adsorbed material thereupon from the oil, washing the said solid with an oil solvent, removing the phosphatide material from said solid by washing the said solid with solvent of said phosphatide material and separating the latter solvent and the said phosphatide material by evaporation of the solvent.

2. Method of recovering phosphatide material from a vegetable oil containing the same which comprises percolating the oil through a column of phosphatide-material-adsorbing solid then washing the column of solid with a preferential oil solvent to remove the oil from the said solid but leaving the adsorbed phosphatide material upon the solid, then washing the column of solid with a solvent of the phosphatide material to remove the said material from the solid, and then separating the latter solvent and the phosphatide material by evaporation of the solvent.

3. Method of recovering phosphatide material from a vegetable oil containing it as set forth in claim 1 wherein parts of the material are removed by successive washings with different solvents and said parts are recovered separately by evaporation of the corresponding solvents.

4. Method of claim 2 wherein parts of the material are removed by successive washings with different solvents and said parts are recovered separately by evaporation of the corresponding solvents.

5. Method of claim 1 wherein the phosphatide-material-solvent is ethyl ether.

6. Method of claim 2 wherein the phosphatide-material-solvent is ethyl ether.

7. Method of claim 1 wherein the phosphatide-material-solvent is ethyl alcohol.

8. Method of claim 2 wherein the phosphatide-material-solvent is ethyl alcohol.

9. Method of claim 1 wherein parts of the phosphatide material are successively removed from the adsorbing solid by successive washings with different solvents comprising ethyl ether, anhydrous ethyl alcohol and dilute ethyl alcohol.

10. Method of claim 2 wherein parts of the phosphatide material are successively removed from the adsorbing solid by successive washings with different solvents comprising ethyl ether, anhydrous ethyl alcohol and dilute ethyl alcohol.

11. Method of claim 1 wherein the vegetable oil is soybean oil.

12. Method of claim 2 wherein the vegetable oil is soybean oil.

13. Method of claim 1 wherein the oil solvent is acetone.

14. Method of claim 2 wherein the oil solvent is acetone.

HENRY R. KRAYBILL.
PEARL H. BREWER.
MAX HORSLEY THORNTON.